(No Model.)
J. W. HYATT.
FILTERING AGENT.
No. 272,442. Patented Feb. 20, 1883.
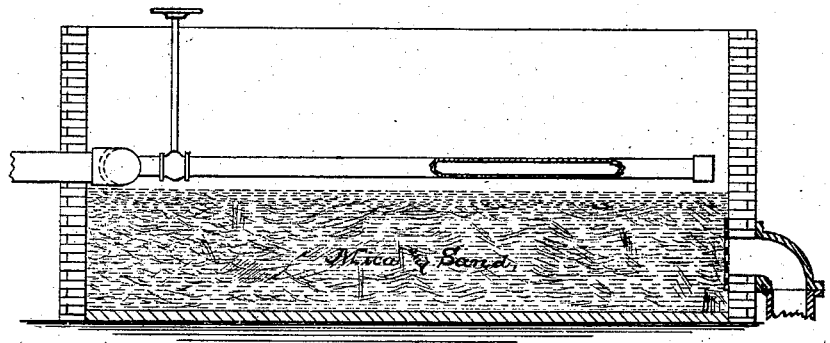
WITNESSES –
Chas. E. Gill
Herman Gustow
INVENTOR –
John W. Hyatt,
By his Attorney,
Rowland Cox.

UNITED STATES PATENT OFFICE.

JOHN W. HYATT, OF NEWARK, NEW JERSEY.

FILTERING AGENT.

SPECIFICATION forming part of Letters Patent No. 272,442, dated February 20, 1883.

Application filed June 22, 1882. (No model.)

*To all whom it may concern:*

Be it known that I, JOHN W. HYATT, of Newark, in the county of Essex and State of New Jersey, have invented a new and useful Improvement in Filtering Agents, of which the following is a specification, reference being had to the accompanying drawing, which shows a central vertical section of a well-known form of filter.

The invention has relation to improvements in filtering agents; and it consists in utilizing a filter-bed in which material in the form of flakes is used in connection with what is known as "granular material."

The best illustrations of the kinds of materials which I employ are mica and sand, the former being an illustration of what has been referred to as "material in the form of flakes" and the latter an illustration of the material which has been referred to as "granular material." In practice I have found that four parts of material in the form of flakes to one part of granular material produces a bed of a very efficient character; but these proportions are not essential and may be very greatly varied, if desired.

The proportions I have mentioned are the best of which I have a knowledge when mica and sand are used; but, as has been stated, other proportions may be employed with good results.

The material in the form of flakes will by preference be reduced to pieces, say, about half an inch in width, more or less, and of a thickness such as will naturally be assumed by the mica when it is ground; but it is not essential that the material in the form of flakes be of any given size to produce a satisfactory result, although the size I have mentioned has been found to be very desirable. Neither is the size of the particles of granular material of the essence of the invention, although I prefer to use ordinary sand.

The bed will be made of any desired thickness, according to circumstances, the new agent being employed, substantially as granular material has been heretofore employed, as occasion may require.

I do not limit my claim to any particular kind of material in the form of flakes, nor to any particular kind of granular material; but

What I claim as new is—

1. A filter-bed consisting of material in the form of flakes and granular material, substantially as described.

2. A filter-bed consisting of mica and granular material, substantially as set forth.

In testimony that I claim the foregoing improvement in filtering agents, as above described, I have hereunto set my hand this 19th day of June, 1882.

JOHN W. HYATT.

Witnesses:
CHAS. C. GILL,
HERMAN GUSTOW.